(12) United States Patent
Feinbloom et al.

(10) Patent No.: US 6,616,317 B2
(45) Date of Patent: *Sep. 9, 2003

(54) REMOTE LIGHT SOURCE DEVICE WITH IMPROVED HEAT MANAGEMENT

(75) Inventors: Richard E. Feinbloom, New York, NY (US); Amy Sue Grumet-Avallone, Smithtown, NY (US); Hil Sim Yee, Hicksville, NY (US)

(73) Assignee: Designs for Vision, Inc., Ronkonkoma, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/416,872

(22) Filed: Oct. 13, 1999

(65) Prior Publication Data

US 2002/0048178 A1 Apr. 25, 2002

(51) Int. Cl.[7] .............................................. F21V 21/00
(52) U.S. Cl. ........................ 362/580; 362/581; 362/294; 362/373
(58) Field of Search ................................ 362/580, 581, 362/574, 294, 373

(56) References Cited

U.S. PATENT DOCUMENTS

| 4,613,931 A | * | 9/1986 | Messinger ................... 362/373 |
| 4,922,385 A | * | 5/1990 | Awai ............................ 362/32 |
| 5,099,399 A | * | 3/1992 | Miller et al. .................. 362/32 |
| 5,725,296 A | | 3/1998 | Bibbiani et al. .............. 362/32 |

* cited by examiner

Primary Examiner—Sandra O'Shea
Assistant Examiner—Ronald E. DelGizzi
(74) Attorney, Agent, or Firm—Duane Morris LLP

(57) ABSTRACT

A remote light source device for generating light which is transmitted to a light emitting device of an illumination system by a fiberoptic cable coupled between the light source device and the light emitting device. The light source device includes a light source and a cover or housing containing the light source, the cover or housing having a light orifice aligned with the light source. A fiberoptic cable coupler assembly is mounted to an exterior surface of the cover or housing adjacent the light orifice. The coupler assembly permits removable coupling of a fiberoptic cable to the device, the coupler assembly also being operative for aligning an end of the cable with the light orifice of the cover or housing so that light generated by the light source is received at the end of the cable for transmission thereby. Structures are provided for preventing the fiberoptic cable coupler assembly from becoming substantially heated by the light source.

24 Claims, 8 Drawing Sheets

REMOTE LIGHT SOURCE DEVICE WITH IMPROVED HEAT MANAGEMENT

FIELD OF THE INVENTION

This invention relates to illumination systems, and more particularly, to a remote light source device having improved heat management for use in such systems.

BACKGROUND OF THE INVENTION

Illumination systems, especially those which permit physicians and dentists to provide an area of high intensity illumination without the use of hands are important in treatment and examination of patients. Such an illumination system typically consists of a light emitting device, a remote light source device and a fiberoptic cable transmitting light generated by the remote light source device to the light emitting device. The remote light source device usually includes a light source consisting of a bulb as well as electronic controls and electrical connections contained in a housing. The housing includes a fiberoptic cable coupler which aligns one end of the fiberoptic cable with the bulb so that light produced thereby can enter and be transmitted by the cable. The light emitting device usually includes a headband assembly worn by the user, having a lens which projects the transmitted light exiting the other end of the fiberoptic cable in front of the user.

This type of remote light source device typically suffers from the principle disadvantage that the bulb contained therein generates a substantial quantity of heat. This heat necessitates more frequent replacement of the bulb and raises the exterior surfaces of the housing, including the fiberoptic cable coupler, to temperatures which can burn skin.

To reduce the problems associated with the heat generated by the bulb, conventional remote light source devices typically include a fan to remove heat generated inside the housing. Unfortunately, the cooling fan is only marginally successful in controlling the amount of generated heat within these devices, as the exterior surfaces and the fiberoptic cable couplers remain uncomfortably hot and difficult to handle.

Accordingly, there is a continuing need for a remote light source device with improved heat management.

SUMMARY OF THE INVENTION

A remote light source device for generating light which is transmitted to a light emitting device of an illumination system by a fiberoptic cable coupled between the light source device and the light emitting device. The light source device comprises light generating means and housing means containing the light generating means, the housing means having a light orifice aligned with the light generating means. Fiberoptic cable coupling means are mounted to an exterior surface of the housing means adjacent the light orifice. The coupling means permits removable coupling of a fiberoptic cable to the device, the coupling means also being operative for aligning an end of the cable with the light orifice of the housing means so that light generated by the light generating means is received at the end of the cable for transmission thereby. Heating preventing means are provided for preventing the fiberoptic cable coupling means from becoming substantially heated by the light generating means.

In another aspect of the invention, an illuminating system comprising a light emitting device and the remote light source device described immediately above. A fiber optic cable having a first end removably coupled to the light source device and at least a second end coupled to the light emitting device, is provided for transmitting light generated by the light source device to the light emitting device light.

BRIEF DESCRIPTION OF THE DRAWINGS

The advantages, nature and various additional features of the invention will appear more fully upon consideration of the illustrative embodiments now to be described in detail in connection with the accompanying drawings wherein.

DETAILED DESCRIPTION OF THE INVENTION

Figure 1:
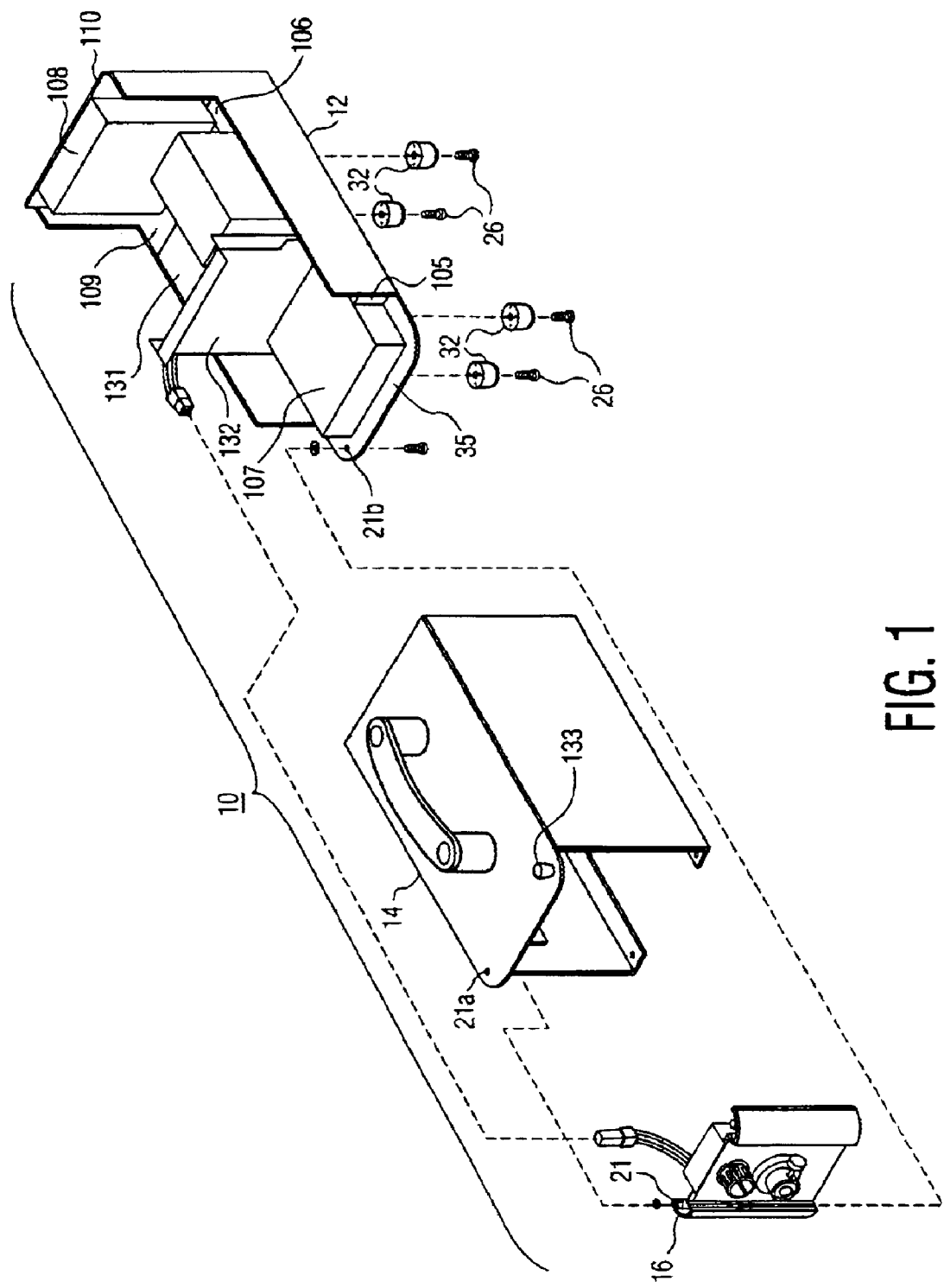
FIG. 1 is an exploded perspective view of a remote light source device according to an embodiment of the invention.

FIG. 1 shows a remote light source device 10 according to an embodiment of the invention. The light source device 10 generally comprises a chassis 12 stamped from sheet metal or aluminum, mounting and connecting various electronic components as will be described further on, a cover or housing 14 enclosing the components mounted on the chassis 12, and a door 16 mounting a light source 70 (FIG. 3C), hinged to the cover 14 and chassis 12.

Figure 2A:
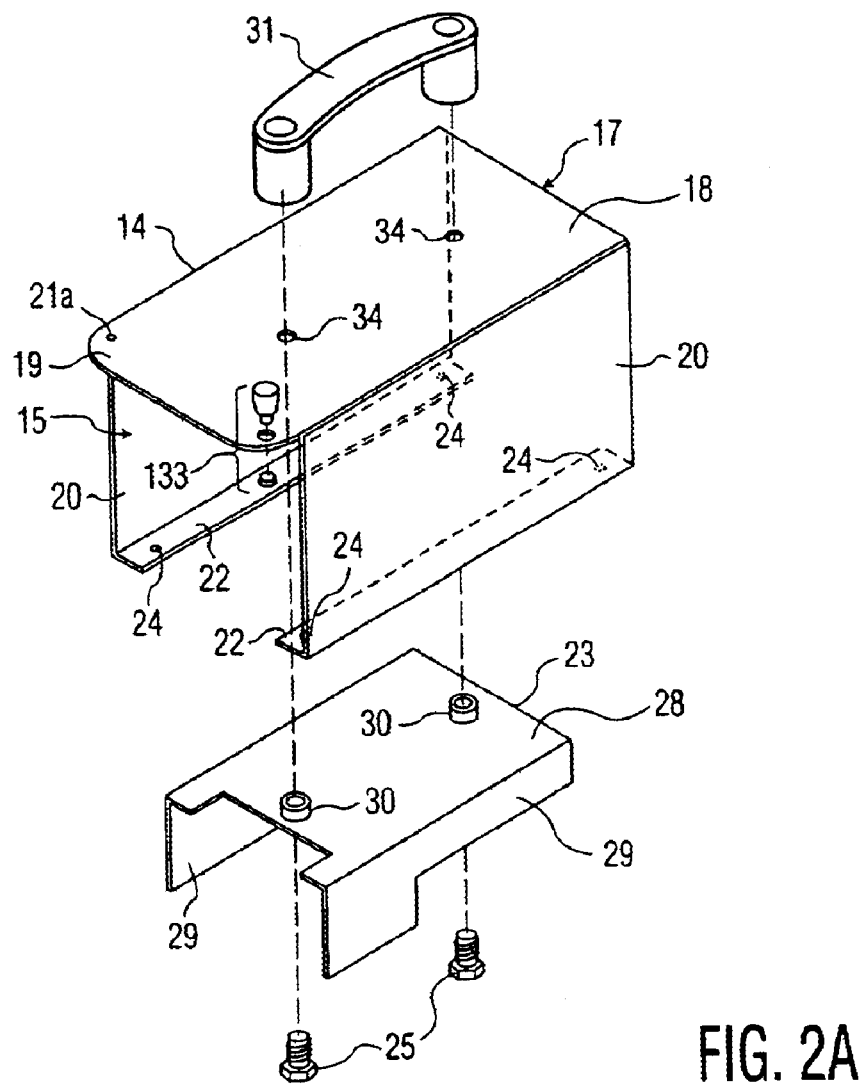
FIG. 2A is an exploded perspective view of the cover of the device.

FIG. 2A shows the cover or housing 14 in greater detail. The cover or housing 14 is typically stamped from sheet metal or aluminum and has an open front end 15 and an open rear end 17 with a top wall 18 extending between a pair of side walls 20. The top wall 18 includes an overhanging portion 19, which in conjunction with a corresponding bottom wall portion 35 of the chassis 12 (FIG. 1), hinges the door 16 to the cover 14 and chassis 12. The overhanging portion 19 includes a conventional spring loaded plunger latch 133 which cooperates with the door 16 to permit latching and unlatching thereof. Inwardly extending flanges 22 project from the bottom of the side walls 20. The flanges 22 include apertures 24 for fastening the cover 14 to a bottom wall 109 of the chassis 12 with screw or like fasteners 26 that also attach support feet 32 to the bottom wall 109 thereof (FIG. 1).

Figure 2B:
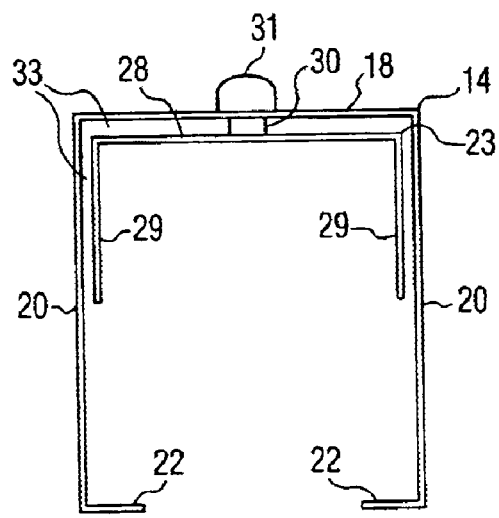
FIG. 2B is a front elevational view of the cover of the device.

Referring to FIGS. 2A and 2B, a heat shield 23 made of sheet metal, aluminum, or other suitable materials, and a carrying handle 31 made from plastic or other suitable materials, are respectively attached to the inner and outer surfaces of the cover top wall 18 by conventional screw or like fasteners 25 which pass through openings 34 in the top wall 18. The heat shield 23 includes a horizontal wall 28 bridging a pair of downwardly extending vertical walls 29. Spacers 30 are provided between the horizontal wall 28 of the heat shield 23 and the top wall 18 of the cover 14 to provide an insulating air-space 33 therebetween as shown in FIG. 2B. The heat shield 23 advantageously shields the cover 14 from heat generated by the light source 70 mounted on the door 16.

Figure 3A:
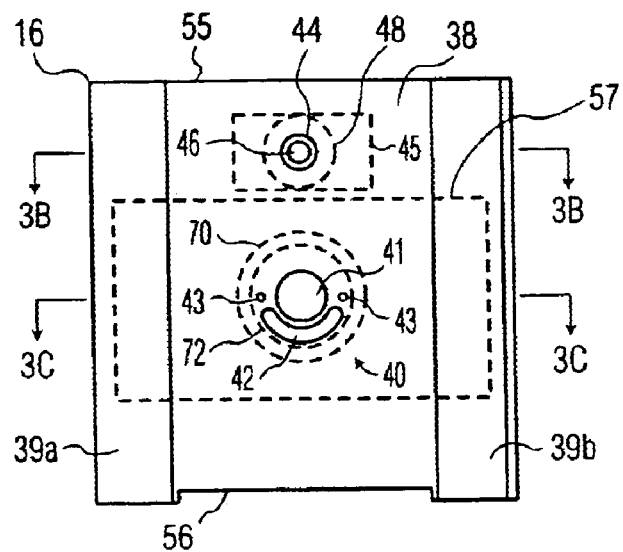
FIG. 3A is a front elevational view of the door of the device.
Figure 3B:
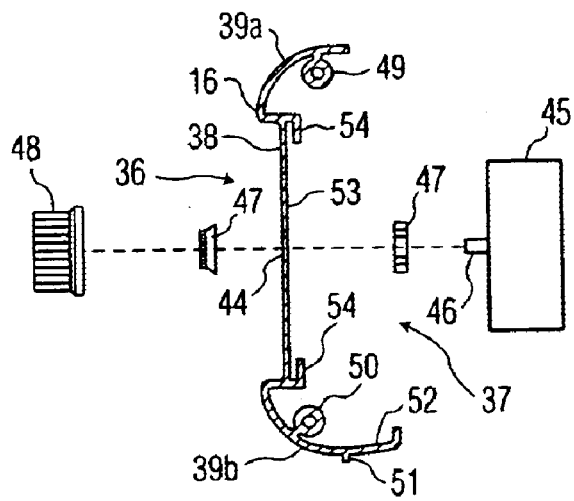
FIG. 3B is an exploded, partial sectional view through line 3B—3B of the door of FIG. 3A.
Figure 3C:
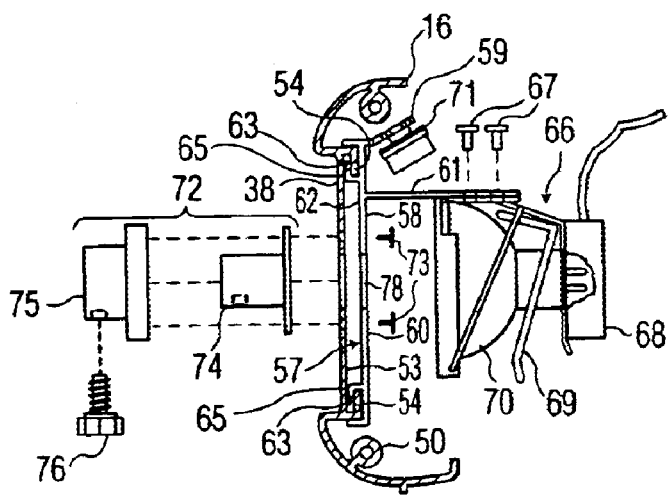
FIG. 3C is an exploded, partial sectional view through line 3C—3C of the door of FIG. 3A.

FIGS. 3A–3C collectively show the details of the door 16 of the device 10. The door 16 is typically extruded from aluminum and includes a front side 36, a rear side 37, and a recessed center panel 38 which extends between first and second side panels 39a, 39b that curve back toward the rear side 37 of the door 16. The recessed panel's 38 inner surface 53 includes two vertical L-shaped flanges 54 which extend between the door's 16 top and bottom edges 55, 56. The recessed panel 38 further includes a coupler mounting area 40 which defines a circular light orifice 41, and an air slot vent 42. Fastener apertures 43 are provided between the ends of the air slot vent 42. A fiberoptic cable coupler assembly 72 is mounted to the coupler mounting area 40 of the recessed panel 38 on the front side 36 of the door 16 with conventional screw or like fasteners 73 which extend through the apertures 43 in the recessed panel 38. The coupler assembly 72 includes a chuck 74, a chuck cover 75 and a thumb set screw 76 for locking a fiber optic cable (not shown) in the chuck 74. Above the coupler mounting area 40 is an opening 44 which permits a control shaft 46 of a dimmer switch 45 mounted on the rear side 37 of the door 16 to extend therethrough. The dimmer switch 45 is retained to the inner surface 53 of the recessed panel 38 with conventional mounting hardware 47. A control knob 48 is mounted on the free end of the dimmer switch shaft 46.

Referring particularly to FIG. 3B, the inner surface of the first side panel 39a includes a hinge member 49 which allows the door 16 to be pivotally hinged to the cover 14 and the chassis 12. This can be accomplished using a pin (not shown) installed through a first hinge aperture 21a defined in the overhanging portion 19 of the cover 14 and the top 21 of the hinge member 49 of the door 16, and a screw (not shown) installed through a lower hinge aperture 21b defined in the extension portion 35 of the chassis 12 and the bottom of the hinge member 49. The inner surface of the second side panel 39b includes a plunger receiving member 50 which cooperates with the plunger latch 133 of the cover 14 to latch and unlatch the door 16. The outer surface of the second side panel 39b includes a stop member 51 which coacts with an adjacent side wall 20 of the cover 14 to prevent the door 16 from being pivoted into the interior of the device 10. The rear edge of the second side panel 39b defines an L-shaped extension 52 that engages an electrical safety interlock switch mounted on the chassis 12 (not shown) that interrupts electrical power to all the components of the device 10 when the door 16 is opened.

Figure 4A:
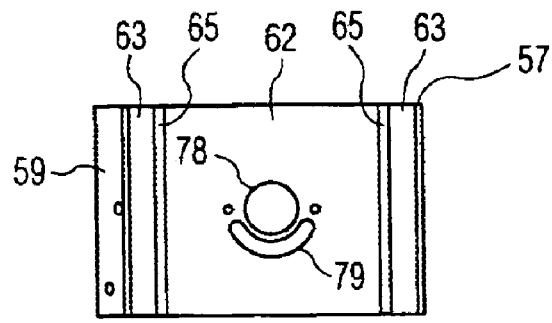
FIG. 4A is a front elevational view of the second heat shield of the device.
Figure 4B:
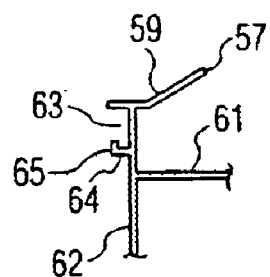
FIG. 4B is an enlarged end view of the channel of the second heat shield of FIG. 4A.

Referring to FIG. 3C and FIGS. 4A and 4B, the inner surface 53 of the recessed panel 38 mounts a second heat shield 57. The second heat shield 57 is typically extruded from aluminum and includes a main plate 58 adjacent to a side plate 59. The shield main plate 58 has an inner surface 60 which is made reflective (shiny) by plating and polishing. A lamp mounting bracket 61 extends perpendicularly away from the inner surface 60. The shield main plate 58 also has an outer surface 62 which defines two channels 63. Each channel 63 has an inner wall 64 that defines a channel locking projection 65. The channels 63 slidably engage the L-shaped flanges 54 on the inner surface 53 of the recessed panel 38 to mount the second heat shield 57 on the rear side 37 of the door 16. The outer surface 62 of shield main plate 58 further defines a light orifice 78 that axially aligns with the light orifice 41 of the recessed panel 38 of the door 16, and an air slot vent 79. The air slot vent 79 is typically aligned with the air slot vent 42 in the recessed panel 38 of the door 16. A socket assembly 66 is attached to the bracket 61 of the heat shield 57 with conventional fasteners 67. The socket assembly 66 mounts a light source 70 that generates high intensity light. The reflective inner surface 60 of the heat shield 57 causes some of the heat generated by the light source 70 to be reflected back toward the light source 70. The light source 70 preferably comprises an extended life 24 volt EJL-5 bulb which operates at 24 or 25 volts. A standard 24 volt EJA bulb, which has a shorter life expectancy, can also be used if desired. The socket assembly 66 includes a pivoting lever 69 which helps disengage the light source 70 from a connector socket 68 of the assembly 66. A thermostatic sensor 71 mounted to the shield side plate 59, turns off the light source 70 if the temperature within the device 10 exceeds a predetermined threshold temperature (about 85° C.).

Figure 5A:
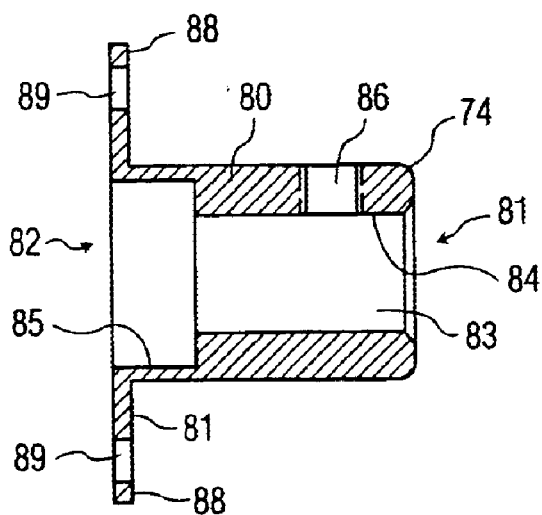
FIG. 5A is a sectional view of the chuck of the device.
Figure 5B:
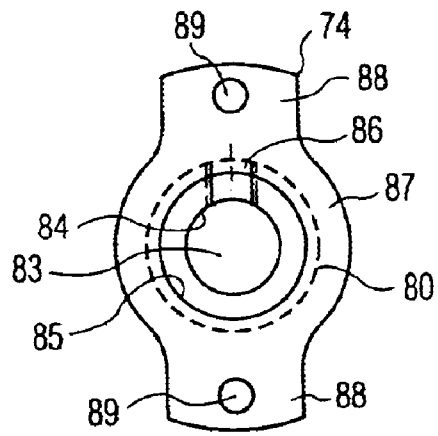
FIG. 5B is an end view of the second end of the chuck of FIG. 5A.

FIGS. 5A and 5B collectively show the details of the chuck 74. The chuck 74 is typically manufactured from metal and includes a first end 81, a second end 82, and a cylindrical body 80. A stepped axial bore 83 extends through the body 80 and defines a first diameter portion 84 sized for receiving an end of a fiberoptic cable (not shown), and a second larger diameter portion 85 having a diameter which typically corresponds to the diameter of the light orifice 41 in the recessed panel 38 of the door 16. A threaded bore 86 extends orthogonally through the cylindrical body and communicates with first diameter portion 84. The bore 86 threadedly receives the thumb set screw 76. The stepped axial bore 83 at the first end 81 of the cylindrical body 80, has a chamfered opening 84. The second end 82 of the cylindrical body 80 includes an outwardly extending flange 87. The flange 87 includes opposing mounting ears 88 with fastener apertures 89 which correspond with the fastener apertures 43 of the door recessed panel 38. The mounting ears 88 and fastener apertures 89 permit the chuck 74 to be mounted to the door 16 as will be explained further on in greater detail.

Figure 6A:
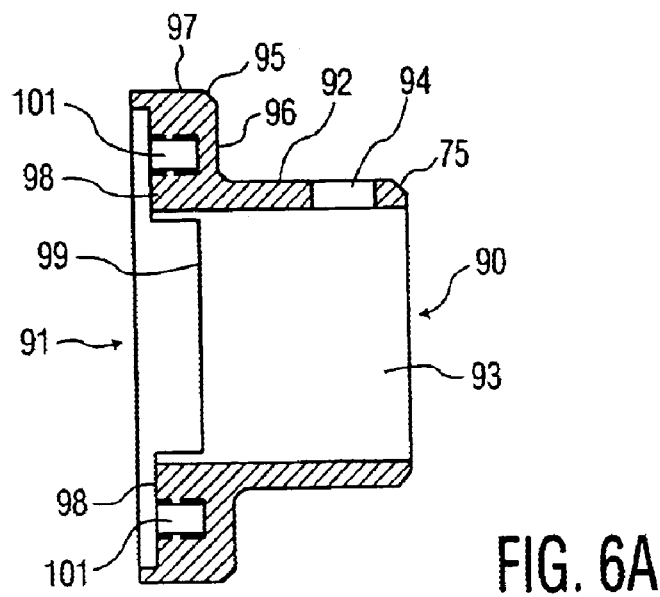
FIG. 6A is a sectional view of the chuck cover of the device.
Figure 6B:
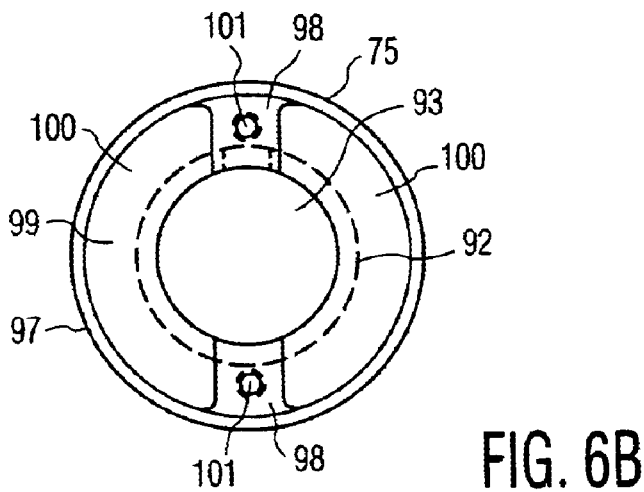
FIG. 6B is an end view of the second end of the chuck cover of FIG. 6A.

FIGS. 6A and 6B collectively show the details of the chuck cover 75. The chuck cover is typically manufactured from plastic and 75 includes a first end 90 and a second end 91, a tubular wall 92 having an opening 93 and a thumb set screw aperture 94 extending perpendicularly through a section of the wall 92 into the opening 93. The second end 91 of the tubular wall 92 includes a base 95 having an annular top wall 96 that extends outwardly from the tubular wall 92 and a skirt 97 depending from the periphery of the top wall 96. A pair of webs 98 are formed on opposing sections of the top wall's 96 under surface 99 such that two C-shaped spaces 100 when open into the tubular wall opening 93 are formed between the skirt 97 and the webs 98. The C-shaped spaces 100 approximately correspond in size and shape to the air slots 42 in the door recessed panel 38 (FIG. 3A) and communicate therewith as will be explained further on. The webs 98 include threaded apertures 101 which threadedly receive the coupler assembly fasteners 73 that extend through the apertures 43 of the door recessed panel 38 and the apertures 89 of the chuck 74.

Figure 7:
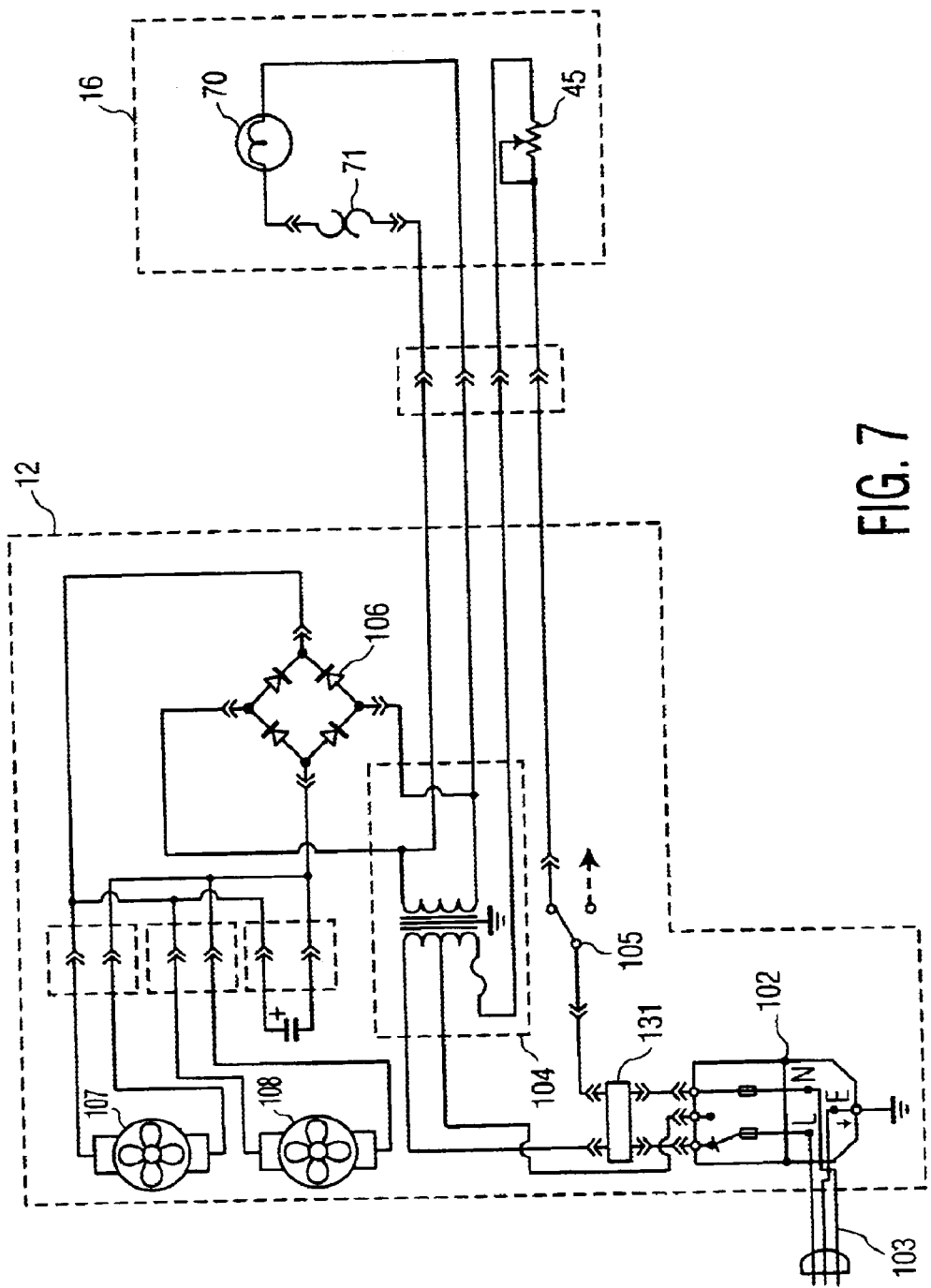
FIG. 7 is an electrical schematic depicting the electronic components of the device.

Referring again to FIG. 1 and also to FIG. 7, the chassis 12 and door 16 mount and connect various electronic components. These components include a power entry module 102 mounted on the chassis 12 which enables connection thereto of a conventional A/C plug and cord assembly 103 which is capable of carrying an A/C signal that powers the device. The power entry module 102 can include a conventional line filter 131 for filtering out noise in the A/C signal. A safety interlock switch 105 is electrically coupled between the power entry module 102 and the other electrical components of the device 10. As explained earlier, the switch 105 interrupts electrical power to all the components of the device 10 when the door 16 is opened. The power entry module 102 applies the A/C signal (typically 230/115 volts) to a step down transformer 104 mounted on the chassis 12. The transformer 104 steps down the voltage of the A/C signal (to about 24–25 volts) and applies it to the dimmer switch 45 and a full bridge rectifier 106. The dimmer switch 45 selectively varies the current of the A/C signal applied to the bulb 70 thus, permitting the intensity of the light generated thereby to be selectively adjusted as desired. The bridge rectifier 106 mounted on the chassis 12 provides a rectified D/C voltage for powering an air intake D/C fan 107 and an air exhaust D/C fan 108. The air intake fan 107 is mounted on the bottom wall 109 of the chassis 12 and is adapted to draw outside ambient air into the device 10. The exhaust fan 108 is mounted on a rear wall 110 of the chassis 12 and is adapted to evacuate or exhaust air heated by operation of the light source 70 from the inside of the device 10. The cooling provided by the fans 107, 108 desirably extending the service life of the device, especially the bulb light source 70. The fans 107, 108 each include a thermistor (not shown) which automatically increases or decreases the speed of the fan with respectively increasing or decreasing temperatures. A perforated screen 132 made of sheet metal or the like, is mounted on the chassis 12 just behind the fan 107, for blocking access to the transformer 104, filter 130 etc.

Figure 8A:
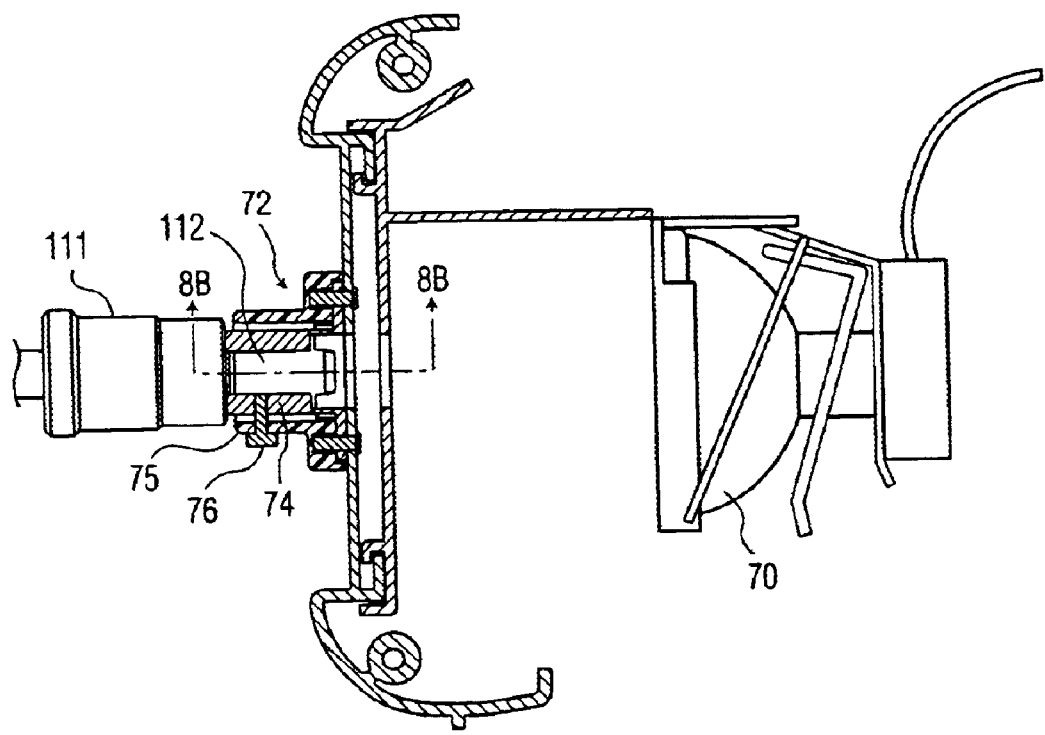
FIG. 8A is a partial sectional top view of the door and fiberoptic cable coupler of the device.

FIG. 8A is a partial top sectional view through the door 16 of the device 10 showing an end 112 of a 2 or 3 mm fiberoptic cable 111 removably inserted in the fiberoptic cable coupler assembly 72. The coupler assembly 72 removably couples the fiberoptic cable 111 to the device 10 and aligns the end 112 of the cable 111 with the door and shield light orifices 41, 78 so that light generated by the light source 70 is received at the end 112 of the cable 111 for transmission thereby.

Figure 8B:
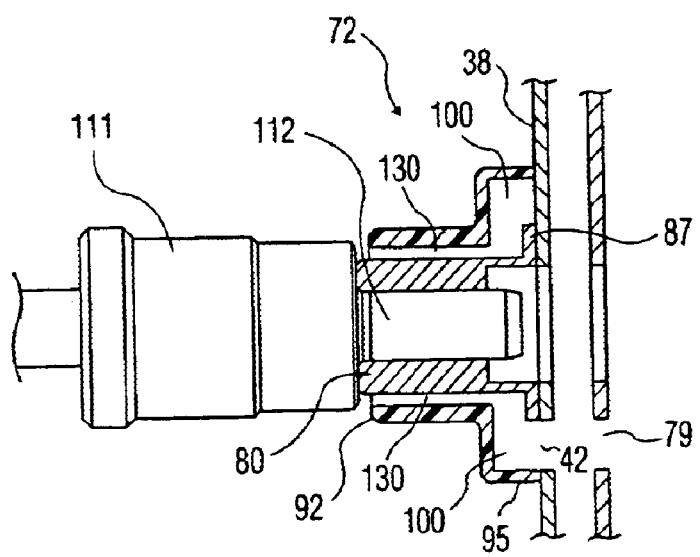
FIG. 8b is a sectional view through line 8B—8B of FIG. 8A.

FIG. 8B is a partial sectional view through line 8B—8B of FIG. 8A showing an ambient air intake duct 130 which is defined in the fiberoptic cable coupler assembly 72. In particular the duct 130 is defined between the cylindrical body 80 and flange 87 of the chuck 74 and the tubular wall 92 and base 95 of the chuck cover 75 of the fiberoptic cable coupler assembly 72. The duct 130 communicates with the air slot vent 42 in the door recessed panel 38 via the C-shaped spaces 100 formed in the base 95 of the chuck cover 75. The duct 130 and air slot vents 42 permit the exhaust fan 108 (FIG. 1) to draw ambient outside air into the coupler assembly 72. The air drawn into the duct 130 passes across outer surface of the chuck 74 and draws away heat absorbed from light source 70 (FIG. 8A) by the chuck 74 during operation of the device 10. This advantageously cools the fiberoptic cable coupler assembly 72 and permits safe handling of the coupler assembly 72 and the fiberoptic cable 111 during decoupling of the cable 111 from the device 10.

Figure 9:
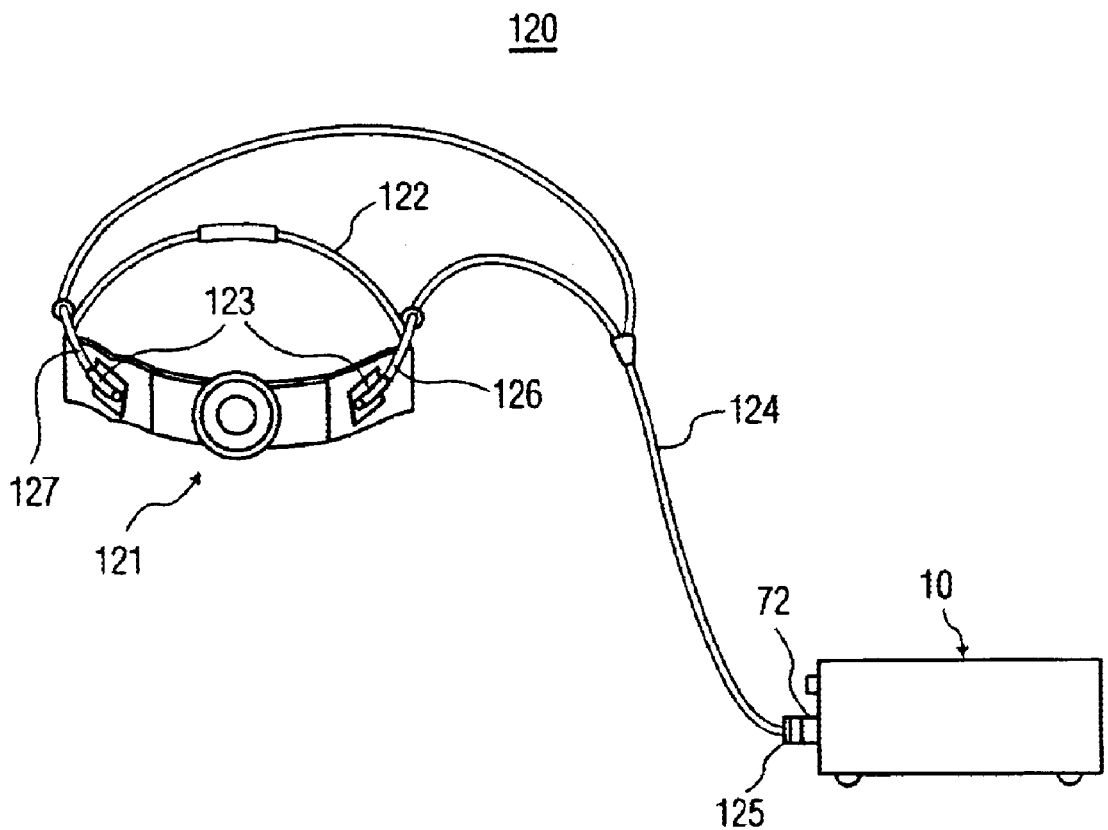
FIG. 9 is a schematic view of an illuminating system employing the remote light source device of the invention.

FIG. 9 shows the remote light source device 10 of the invention as used in a typical illuminating system 120. The system 120 includes a light emitting device 121 which is commonly used by physicians and dentists for providing an area of high intensity illumination that is controllable usually by head movement. The light emitting device 121 consists of a head light assembly 123 mounted on a head set 122. A fiberoptic cable 124 has a first end 125 coupled to the fiberoptic coupler assembly 72 of the light source device 10 and second and third ends 126, 127 connected to the head light assembly 123 of the head set 122. One of ordinary skill in the art will recognize that the remote light source device 10 of the invention can also be used in other types of illumination systems which employ fiberoptical cable coupled remote light source devices.

It should be understood that the embodiment of the invention described herein is merely exemplary, and that a person of ordinary skill in the art can make many variations and modifications to the described embodiment utilizing functionally equivalent elements to those described. For example, in other embodiments of the invention the coupler assembly can be mounted directly on the cover or housing instead of the door. In any case, such variations and modifications, including differing physical geometries, proportions, and materials are intended to be included within the scope of the invention as defined in the appended claims.

What is claimed is:

1. A remote light source device for generating light which is transmitted to a light emitting device of an illumination system by a fiberoptic cable coupled between the light source device and the light emitting device, the light source device comprising:

light generating means;

housing means containing the light generating means, the housing means having a light orifice aligned with the light generating means;

fiberoptic cable coupling means fastened to a planar exterior surface of the housing means adjacent a periphery of the light orifice, the coupling means for removably coupling a fiberoptic cable to the device and aligning the end of the cable with the light orifice of the housing means so that the light generated by the light generating means is received at the end of the cable for transmission thereby; and heating preventing means for preventing the fiberoptic cable coupling means from becoming substantially heated by the light generating means.

2. The remote light source device according to claim 1, wherein the heating preventing means includes heat shielding means disposed between the housing means and the light generating means for preventing the exterior surface of the housing means from becoming substantially heated by the light generating means.

3. The remote light source device according to claim 1, wherein the heating preventing means includes heat shielding means for shielding the fiberoptic cable coupling means from heat generated by the light generating means.

4. The remote light source device according to claim 3, wherein the heat shielding means is disposed between the light generating means and a section of the housing which mounts the fiberoptic cable coupling means.

5. The remote light source device according to claim 4, wherein the heat shielding means is further disposed between other sections the housing means and the light generating means for preventing other exterior surfaces of the housing means from becoming substantially heated by the light generating means and transferring heat to the exterior surface of the housing mounting the fiberoptic cable coupling means.

6. The remote light source device according to claim 1, wherein the heating preventing means includes ambient air ducting means associated with the fiberoptic cable coupling means, the ambient air ducting means for passing ambient air across the coupling means to draw heat therefrom.

7. The remote light source device according to claim 6, wherein the ambient air ducting means communicates with air slot venting means in the section of the housing means having the light orifice.

8. The remote light source device according to claim 7, wherein the ambient air ducting means further includes cover means attached to the fiberoptic cable coupling means, the cover means and the coupling means defining an air duct therebetween which communicates with the air slot venting means.

9. The remote light source device according to claim 8, wherein the heating preventing means further includes air exhausting means for exhausting heated air from the housing means and drawing the ambient air through the duct and into the housing means.

10. The remote light source device according to claim 9, wherein the heating preventing means further includes ambient air intake means for drawing ambient air directly into the housing means.

11. The remote light source device according to claim 6, wherein the ambient air ducting means includes cover means attached to the fiberoptic cable coupling means, the cover means and the coupling means defining an air duct therebetween.

12. The remote light source device according to claim 6, wherein the heating preventing means further includes air exhausting means for exhausting heated air from the housing means and causing the ambient air to pass across the coupling means to draw heat therefrom.

13. An illuminating system comprising:
a remote light source device;
a light emitting device for illuminating an area of interest with light received from the light source device; and
a fiber optic cable having a first end removably coupled to the light source device and at least a second end coupled to the light emitting device, the cable for transmitting light generating by the light source device to the light emitting device light; the remote light source device including:
light generating means;
housing means containing the light generating means, the housing means having a light orifice aligned with the light generating means;
fiberoptic cable coupling means fastened to a planar exterior surface of the housing means adjacent a periphery of the light orifice, the coupling means for removably coupling a fiberoptic cable to the device and aligning the end of the cable with the light orifice of the housing means so that the light generated by the light generating means is received at the end of the cable for transmission thereby; and
heating preventing means for preventing the fiberoptic cable coupling means from becoming substantially heated by the light generating means.

14. The illuminating system according to claim 13, wherein the heating preventing means includes heat shielding means disposed between the housing means and the light generating means for preventing the exterior surface of the housing means from becoming substantially heated by the light generating means.

15. The illuminating system according to claim 13, wherein the heating preventing means includes heat shielding means for shielding the fiberoptic cable coupling means from heat generated by the light generating means.

16. The illuminating system according to claim 15, wherein the heat shielding means is disposed between the light generating means and a section of the housing which mounts the fiberoptic cable coupling means.

17. The illuminating system according to claim 16, wherein the heat shielding means is further disposed between other sections the housing means and the light generating means for preventing other exterior surfaces of the housing means from becoming substantially heated by the light generating means and transferring heat to the exterior surface of the housing mounting the fiberoptic cable coupling means.

18. The illuminating system according to claim 13, wherein the heating preventing means includes ambient air ducting means associated with the fiberoptic cable coupling means, the ambient air ducting means for passing ambient air across the coupling means to draw heat therefrom.

19. The illuminating system according to claim 18, wherein the ambient air ducting means communicates with air slot venting means defined in the section of the housing means having the light orifice.

20. The illuminating system according to claim 19, wherein the ambient air ducting means further includes cover means attached to the fiberoptic cable coupling means, the cover means and the coupling means defining an air duct therebetween which communicates with the air slot venting means.

21. The illuminating system according to claim 20, wherein the heating preventing means further includes air exhausting means for exhausting heated air from the housing means and drawing the ambient air through the duct and into the housing means.

22. The illuminating system according to claim 21, wherein the heating preventing means further includes ambient air intake means for drawing ambient air directly into the housing means.

23. The illuminating system according to claim 18, wherein the ambient air ducting means includes cover means attached to the fiberoptic cable coupling means, the cover means and the coupling means defining an air duct therebetween.

24. The illuminating system according to claim 18, wherein the heating preventing means further includes air exhausting means for exhausting heated air from the housing means and causing the ambient air to pass across the coupling means to draw heat therefrom.

* * * * *